Dec. 22, 1931.  J. BURRI  1,837,528
HEN'S NEST
Filed Nov. 4, 1929   3 Sheets-Sheet 1
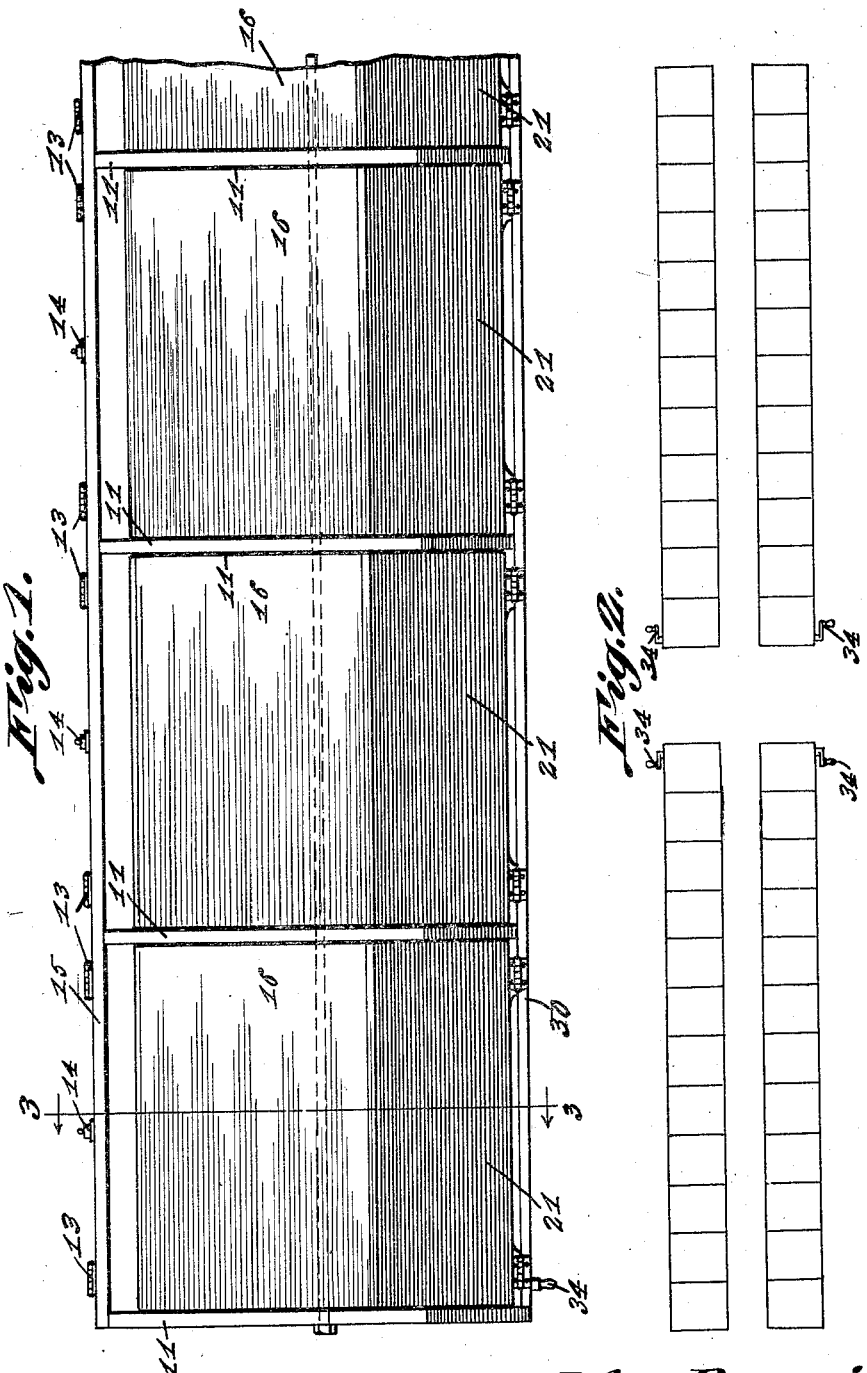
John Burri, INVENTOR
BY Victor J. Evans
ATTORNEY Dec. 22, 1931.  J. BURRI  1,837,528
HEN'S NEST
Filed Nov. 4, 1929   3 Sheets-Sheet 2
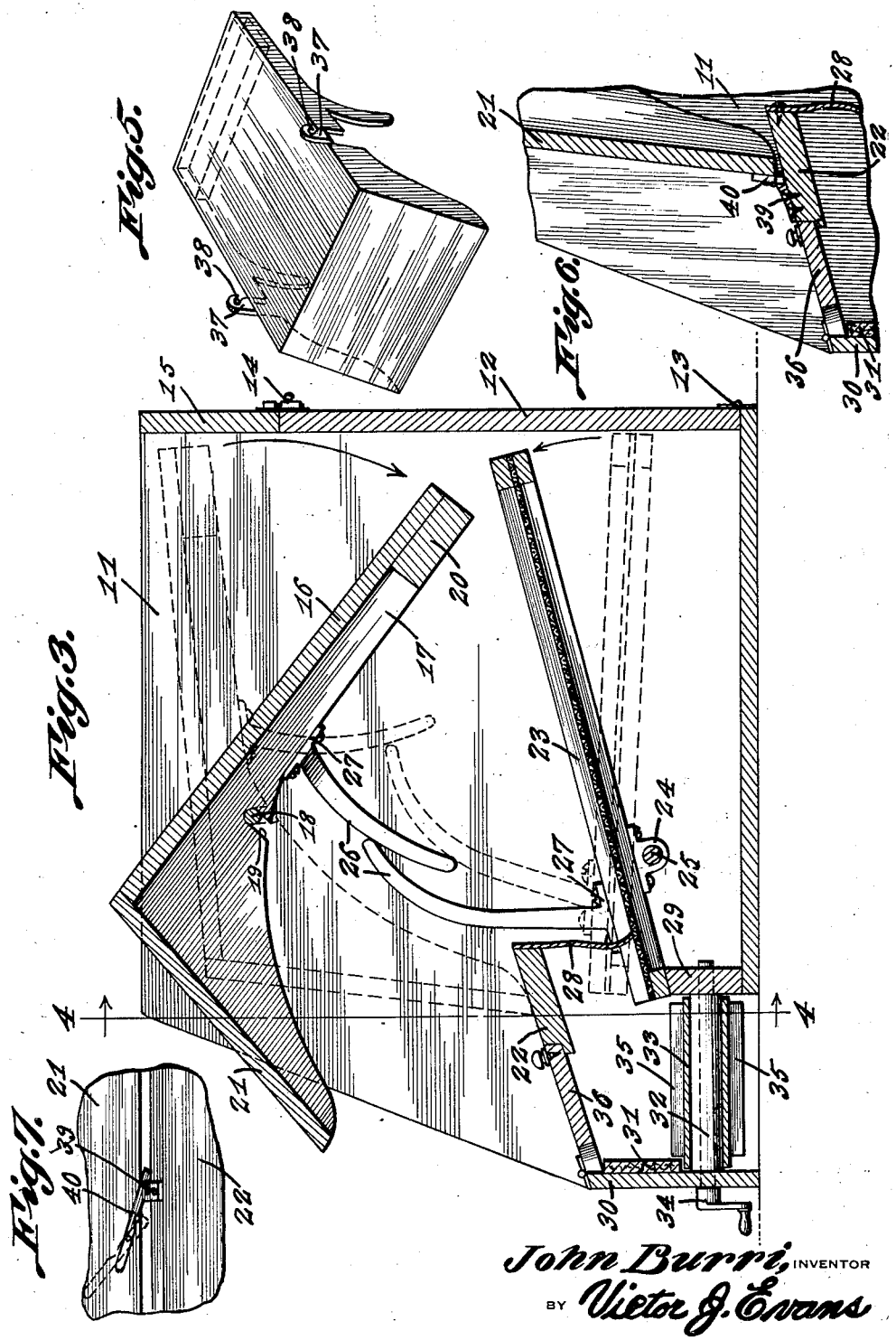
John Burri, INVENTOR
BY Victor J. Evans
ATTORNEY

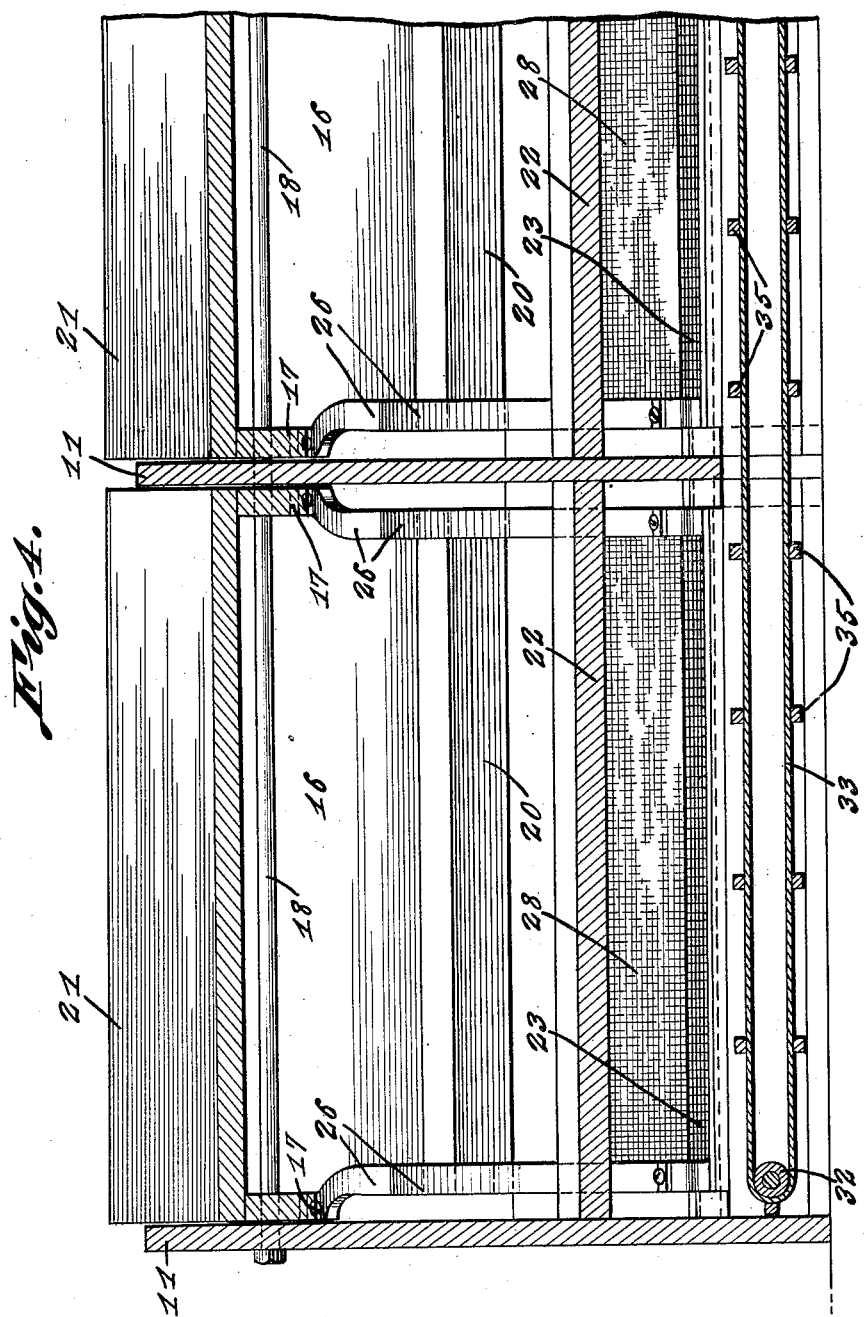

Patented Dec. 22, 1931

1,837,528

UNITED STATES PATENT OFFICE

JOHN BURRI, OF CURTIS, WASHINGTON

HEN'S NEST

Application filed November 4, 1929. Serial No. 404,718.

This invention relates to new and useful improvements in nests for poultry and the like and which embodies among other characteristics means whereby eggs will be automatically discharged from the nest upon the occasion of the hens leaving same.

Another object of the invention contemplates the provision and arrangement of means whereby the setting hens may remain within the nests undisturbed by other hens desiring to enter the same nest.

An additional object of the invention comprehends a form of catch or fall breaker for the eggs to prevent breaking of the egg shells during the discharge operation.

An additional object of the invention consists of a locking mechanism whereby the nests may be utilized as trap nests.

More specifically stated the nests are to be provided with a collecting mechanism whereby all of the eggs may be gathered at once from a common point.

With the above and other objects in view, the invention further consists of the following novel features and details of construction, to be hereinafter more fully described, illustrated in the accompanying drawings and pointed out in the appended claims.

In the drawings:—

Figure 1 is a fragmentary top plan view of my form of nest construction.

Figure 2 is a plan view illustrative of a floor plan arrangement of nests within a hen-house.

Figure 3 is a sectional view taken on line 3—3 of Figure 1.

Figure 4 is a vertical sectional view taken on line 4—4 of Figure 3.

Figure 5 is a perspective view of the modified form of nest closure.

Figure 6 is a detail sectional view of a locking mechanism for the form of closure when the invention is to be employed as a trap nest.

Figure 7 is a fragmentary front elevation of the Figure 6 locking mechanism.

As substantiated from the illustrations of my invention in Figures 1, 2 and 4 of the drawings, it is quite obvious that it is my intention to arrange nests of this character in series or to line the walls of a hen-house in the manner suggested in Figure 2. For this reason, a base plate 10 of elongated formation may be sufficient in length to provide the bottoms for a succession of nests. Partition walls 11, carried by and upstanding from the upper side of the base plate 10, define compartments or nests therebetween. The rear walls 12 for the nest compartments are hingedly mounted adjacent their lower edges, as at 13, to the base 10 and detachably connected through the instrumentality of latch members with a stationary strip 15, which in conjunction with the end walls complete the rearmost ends of the nests.

The tops or closures 16 for the nests are provided with depending side flanges 17 disposed between the adjacent partitions 11. Rod members 18, carried by and horizontally disposed between the partitions 11, are projected within slots or cut-out portions 19 in the flanges 17 whereby the closures or lids 16 may swing upon the rods 18 to occupy the full and dotted line positions shown in Figure 3 of the drawings.

A weight bar or strip, such as indicated at 20, arranged between the side flanges 17 and adjacent the innermost projecting end of the closure or lid 16, normally disposes the closure or lid 16 in the full line Figure 3 position. A front wall 21, angularly disposed upon the foremost projecting edge of the closure or lid 16 depends for appreciable distances therefrom, and is designed for seating engagement with the upper surface of bridge or stop plate 22. The latter having connection at their ends with the adjacent sides of the partitions 11. The bridge pieces 22 are disposed in positions elevated from the upper surfaces of the base plate 10. Screen frames 23, having pipe clamps or other forms of bearings 24, provide the means for rockingly mounting said frames upon bar members 25.

Curved complemental arms 26, having attaching portions 27 secured to the flanges 17 for the closures or lids 16 and upon the side rails of the screen frames 23 respectively, are adapted to dispose the curved extremities thereof for overlapping frictional engagement. When a hen jumps from the bridge piece or bar 22 upon the screen frame 23, her weight, being wholly directed to one side of the eccentric pivot connection for the frame, will shift said frame to occupy the Figure 3 dotted line position.

The curved arms, carried by the frame and engaging the complemental arms upon the closure or lid, will in turn force the latter into closed position whereby the hen will be undisturbed by other hens while setting. The hen, upon leaving the nest, and removing her weight from the frame 23, will allow the frame and closure lid to again occupy their respective full line positions and the egg laid by the hen will roll down over the mesh wire of the frame but its fall will be broken by a curtain 28 depending from the inner edge of the bridge piece 22 within the nest proper.

The forwardly shifting swinging movement of the screen frames 23 are restricted by an upstanding wall 29 which in conjunction with the front wall 21 and bridge piece 22 will close the entire front of the nest. A wall member 30, extending upwardly for an appreciable distance above the upstanding wall 29 and in spaced parallelism therewith, carries a bumper 31 of strip like formation upon the inner side thereof and which may be composed either of felt or rubber to prevent cracking of the egg shell when directed thereagainst. Roller members 32, having the ends thereof journaled between the upstanding wall 29 and wall member 30, carry and operate an endless belt 33 forming a conveyor for the eggs from a series or succession of nests to a common point where the latter are gathered.

Crank arms 34, carried upon the roller members 32 and projected exteriorly of the wall members 30, provide the operating means for the endless conveyor. As shown in Figures 3 and 4 of the drawings, the endless belt or conveyor carries a multiplicity of blocks or strips 35 horizontally disposed at spaced intervals thereon whereby retrograde movement of the eggs along the belt while the latter is in operation will be prevented and cracking of the eggs, incident to one egg rolling against the other, will be obviated. Doors 36, hingedly mounted upon the wall members 30, permit inspection of the endless conveyor immediately adjacent each of the screen frames 23 in order that the individual egg laying records of the hens may be tabulated.

In Figure 5 of the drawings, I have illustrated a modified form of closure lid constructed of metal throughout and which embodies a front wall having curved arms as integral parts thereof. The side flanges are also formed in one piece with the modified form of closure lid and are slotted after the manner of the flanges 17 but do not accommodate the rod members 18 in like manner in view of the fact that ears, indicated as at 37, are formed by the providing of said slots. The ears are in turn shaped to provide open eyes 38 to be passed around and about the adjacent portions of the rod member. The rods will therefore be arranged above the closure lids and oiling of the bearing connections will be facilitated without incurring the removal of the closure lid.

In Figures 6 and 7 of the drawings, I have shown in the right angularly disposed views the manner in which the invention may be used for trapping the hens after they have entered the nests. The locking connections may be readily applied upon both forms of closure lids in the following manner. Strike plates 39, carried upon the upper surfaces of the bridge plates 22 and spaced at their ends from the adjacent outer surfaces of either of the forms of front walls for the particular type of closure lid, will facilitate the positioning of the longer end of a latch finger 40 therebetween when the latter descends from its eccentric pivot connection. The latch fingers are preferably located upon the front walls of the closure lids. By swinging the latch fingers 40 to occupy the dotted line position shown in Figure 7 of the drawings, the nests may be automatically opened in the conventional manner, particularly desirous when the hens leave the nests.

By arranging the crank handles for the rollers of the endless conveyors in the manner shown in Figure 2 of the drawings, the poultryman may gather or otherwise collect the eggs from the middle of the hen-house between the spaced ends of adjacent series of nests.

The invention is susceptible of various changes in its form, proportions and minor details of construction, and the right is herein reserved to make such changes as properly fall within the scope of the appended claims.

Having thus described the invention, what is claimed is:—

1. A poultry nest comprising a base plate having upstanding spaced parallel partition walls, a screen frame swingably mounted between said walls and above the base plate, a closure lid carrying the nest front wall being tiltably mounted an appreciable distance above said frame, a bridge piece carried between the partition walls and engageable with the adjacent portion of the front wall when the latter is swung in closed position, a curtain carried by and depending from the bridge piece to break the fall of eggs rolling forwardly upon the screen frame subsequent to the leaving of the fowl and the elevation of the frame, and a conveyor located adjacent the forwardly inclined end of the frame to accommodate the egg.

2. A poultry nest comprising a base plate having upstanding spaced parallel partition walls, a screen frame swingably mounted between said walls and above the base plate, a closure lid carrying the nest front wall being tiltably mounted an appreciable distance above said frame, a bridge piece carried between the partition walls and engageable with the adjacent portion of the forward wall when the latter is swung in closed position, complemental arm members carried by and projecting from the adjacent sides of the frame and closure lid in oppositely disposed relation being designed for overlapping frictional engagement to automatically open and close the nest when the latter is open and in use, a curtain carried by and depending from the bridge piece to break the fall of eggs rolling forwardly upon the screen frame subsequent to the leaving of the fowl and the elevation of the frame, and a conveyor located adjacent the forwardly inclined end of the frame to accommodate the egg.

3. A poultry nest comprising a base plate having upstanding spaced parallel partition walls, a screen frame swingably mounted between said walls and above the base plate, a closure lid carrying the nest front wall being tiltably mounted an appreciable distance above said frame, a bridge piece carried between the partition walls and engageable with the adjacent portion of the front wall when the latter is swung in closed position, a curtain carried by and depending from the bridge piece to break the fall of eggs rolling forwardly upon the screen frame subsequent to the leaving of the fowl and the elevation of the frame, a conveyor located adjacent the forwardly inclined end of the frame to accommodate the egg, and means carried by the bridge piece and front wall to lockingly retain the latter against displacement subsequent to the entry of a fowl.

In testimony whereof I affix my signature.

JOHN BURRI.